US009151213B2

(12) United States Patent
Radel et al.

(10) Patent No.: US 9,151,213 B2
(45) Date of Patent: Oct. 6, 2015

(54) INTERNAL COMBUSTION ENGINE, IN PARTICULAR TWO-STROKE INTERNAL COMBUSTION ENGINE

(71) Applicant: MAKITA CORPORATION, Aichi (JP)

(72) Inventors: Harry Radel, Geesthacht (DE); Michael Schoenfeld, Rohlstorf (DE); Johannes Luegger, Hamburg (DE)

(73) Assignee: MAKITA CORPORATION, Aichi (JP)

( * ) Notice: Subject to any disclaimer, the term of this patent is extended or adjusted under 35 U.S.C. 154(b) by 279 days.

(21) Appl. No.: 13/852,388

(22) Filed: Mar. 28, 2013

(65) Prior Publication Data
US 2013/0255652 A1 Oct. 3, 2013

(30) Foreign Application Priority Data
Mar. 29, 2012 (DE) ...................... 20 2012 101 134 U (51) Int. Cl.
| F02B 25/00 | (2006.01) |
| F02B 29/00 | (2006.01) |
| F02B 25/16 | (2006.01) |
| F02B 25/20 | (2006.01) |
| F02B 33/30 | (2006.01) |

(52) U.S. Cl.
CPC ................. F02B 29/00 (2013.01); F02B 25/16 (2013.01); F02B 25/20 (2013.01); F02B 33/30 (2013.01)

(58) Field of Classification Search
CPC .................... F02B 2710/036; F02B 2700/035; F02B 2700/037; F02B 2720/135; F02B 2720/136; F02B 2720/235; F02B 2720/236
USPC ... 123/73 PP, 73 R, 73 A, 65 W, 65 WA, 65 P
See application file for complete search history.

(56) References Cited

U.S. PATENT DOCUMENTS

| 1,531,066 | A | * | 3/1925 | Brice ........................... 123/73 A |
| 2,477,374 | A | * | 7/1949 | Ide ............................... 123/73 A |
| 3,227,146 | A | * | 1/1966 | Drebes ......................... 123/73 R |
| 3,643,637 | A | * | 2/1972 | Strossner et al. .......... 123/41.72 |
| 3,695,240 | A | * | 10/1972 | Cookson ..................... 123/73 A |

(Continued)

FOREIGN PATENT DOCUMENTS

| DE | 841 827 | 6/1952 |
| DE | 2741649 | 3/1979 |
| DE | 31 46 439 | 6/1983 |
| DE | 228 320 | 9/1985 |
| DE | 3837502 | 5/1990 |
| DE | 197 07 767 | 11/1997 |
| DE | 102 10 892 | 10/2002 |
| DE | 101 50 322 | 4/2003 |
| DE | 103 19 216 | 11/2004 |
| JP | 59-136518 | 8/1984 |

OTHER PUBLICATIONS

German search report dated Mar. 29, 2012.

Primary Examiner — Hung Q Nguyen
(74) Attorney, Agent, or Firm — Greenblum & Bernstein, P.L.C.

(57) ABSTRACT

To create an internal combustion engine including a crankcase and a cylinder, wherein a piston is guided in the cylinder to perform a stroke movement and movably defines a combustion chamber, and wherein at least one transfer channel, through which ignition mixture is guided from the crankcase into the combustion chamber, is arranged in the cylinder, which leads to a further improvement of the exhaust gas quality and/or of the fuel consumption, in particular for creating an improved metering of ignition mixture into the fuel chamber, it is proposed for the piston to encompass a lower piston edge, which interacts with at least one counter body such that an inlet cross section of the transfer channel for the inflow of the ignition mixture from the crankcase into the transfer channel can be controlled by the stroke movement of the piston by the lower piston edge.

19 Claims, 5 Drawing Sheets

(56) References Cited

U.S. PATENT DOCUMENTS

| | | | |
|---|---|---|---|
| 4,016,850 A * | 4/1977 | Bloemers | 123/193.2 |
| 4,058,104 A * | 11/1977 | Swoager | 123/193.4 |
| 5,370,089 A * | 12/1994 | Harada | 123/73 AD |
| 5,373,820 A * | 12/1994 | Sakamoto et al. | 123/295 |
| 5,379,732 A * | 1/1995 | Mavinahally et al. | 123/73 AA |
| 5,699,761 A | 12/1997 | Yamaguchi et al. | |
| 5,829,394 A * | 11/1998 | Oike et al. | 123/65 PE |
| 6,644,251 B2 | 11/2003 | Klaric | |
| 7,013,850 B2 | 3/2006 | Fattorusso | |
| 2002/0000211 A1* | 1/2002 | Bignion et al. | 123/73 A |
| 2002/0073943 A1* | 6/2002 | Geyer et al. | 123/73 B |
| 2002/0134326 A1 | 9/2002 | Araki | |
| 2004/0255883 A1 | 12/2004 | Yuasa et al. | |

* cited by examiner

INTERNAL COMBUSTION ENGINE, IN PARTICULAR TWO-STROKE INTERNAL COMBUSTION ENGINE

The instant invention relates to an internal combustion engine comprising a crankcase and comprising a cylinder, wherein a piston is guided in the cylinder so as to be able to perform a stroke movement and movably defines a combustion chamber, and wherein at least one transfer channel, through which ignition mixture is guided from the crankcase into the combustion chamber, is arranged in the cylinder. The invention is further directed to an engine-driven device comprising such an internal combustion engine, as well as to a method for operating such an internal combustion engine.

STATE OF THE ART

DE 102 10 892 A1 describes an internal combustion engine comprising a crankcase and comprising a cylinder, in which a piston is guided so as to be able to perform a stroke movement and movably defines a combustion chamber, which is embodied in the cylinder. The combustion chamber is supplied with ignition mixture via transfer channels and the transfer channels end in the space, which is surrounded by the crankcase, via an open end on the crankcase side, whereby an inlet cross section of the transfer channel is formed. An upper piston edge, which opens and closes an outlet cross section of the transfer channels in the manner of a gate valve, serves to open and to close the transfer channels. The opening of the outlet cross section of the transfer channels takes place during the downwards movement of the piston, so that ignition mixture can reach into the combustion chamber. The outlet cross section is closed again only with the upwards movement of the piston, and the ignition mixture is subsequently condensed due to the upwards movement in the direction of the top dead centre. According to the shown design of the internal combustion engine, the transfer channels are introduced in the body of cylinder as transfer channels, which are embodied so as to be closed.

A further design of an internal combustion engine comprising a crankcase and comprising a cylinder, and a piston being guided in the cylinder so as to be able to perform a stroke movement, so as to movably define a combustion chamber, is known from DE 197 07 767 B4. Transfer channels, which are embodied so as to be open in the direction of the bearing surface of the piston, are arranged in the cylinder wall. The transfer channels merge freely into the space, which is surrounded by the crankcase, and the opening and closing of an outlet cross section of the transfer channels into the combustion chamber also takes place via an upper piston edge.

When constructing internal combustion engines, in particular two-stroke internal combustion engines, the objective is on principle to attain low exhaust gas values. In addition to measures, which lead to the improvement of the exhaust gas quality, for example by means of filters and/or catalysts, it is known that the embodiment of the transfer channels can have a positive impact on the exhaust gas quality of the internal combustion engine in view of its position and/or its geometric shape. In addition to the improvement of the exhaust gas quality, the fuel consumption of the internal combustion engine can also be attained by optimizing the transfer channels. For example, it can be avoided that unburned ignition mixture reaches directly into the outlet from the transfer channels and consequently escapes into the exhaust gas system without being burnt.

ILLUSTRATION OF THE INVENTION: OBJECT, SOLUTION, ADVANTAGES

This results in the object of the invention, to embody an internal combustion engine by means of measures, which lead to a further improvement of the exhaust gas quality and/or of the fuel consumption. It is in particular the object to create an improved metering of ignition mixture into the combustion chamber.

This object is solved based on an internal combustion engine according to the preamble of claim 1, an engine-driven device according to the preamble of claim 15 as well as a method according to the claim 16 comprising the respective characterizing features. Advantageous further developments of the invention are specified in the dependent claims.

The invention includes the technical teaching that the piston encompasses a lower piston edge, which interacts with at least one counter body such that an inlet cross section of the transfer channel for the inflow of the ignition mixture from the crankcase into the transfer channel can be controlled by means of the stroke movement of the piston by means of the lower piston edge.

By geometrically adapting the piston and the inlet cross section of the transfer channel in a corresponding manner, it turned out to be a surprise that a control of the inlet cross section of the transfer channel for the inflow of the ignition mixture from the crankcase into the transfer channel leads to an improvement of the exhaust gas quality of the internal combustion engine. In particular the size of the inlet cross section is hereby controlled or changed, respectively. The principle according to the invention of controlling the inlet cross section is thereby in particular based on a conventional design of the internal combustion engine, which is preferably embodied without the principle of an air buffer.

In a particularly advantageous manner, the counter body can be formed by means of an area of the crankcase, by means of an in particular movable control element, by means of a crankshaft bearing for supporting the crankshaft of the internal combustion engine and/or by means of a part of the cylinder base seal. The exemplary embodiments form a stationary part of the internal combustion engine, wherein provision can also be made for a movable control element in the manner of a gate, which is not a basic part of the internal combustion engine. Said gate can be moved manually, with the centrifugal force of at least one rotating component of the internal combustion engine, electromechanically, pneumatically, hydraulically or piezoelectrically. The counter body can further be formed by means of a miscellaneous body, in particular comprising an edge, which can be arranged in the area of the lower end of the transfer channel.

By controlling the inlet cross section of the transfer channel from the crankcase into the transfer channel, the metering of the ignition mixture from the crankcase into the combustion chamber is influenced. The impact on the fuel supply via the crankcase can surprisingly be designed by means of the control such that an improved exhaust gas quality and, under certain conditions also a reduction of the fuel consumption follows. In the instant case, the term lower piston edge can be understood as every area of partial area of the piston, which is not formed by the upper piston side, which defines the combustion chamber, or by at least the upper side surface of the piston. In the instant context, the lower piston edge preferably describes the bottom side of the piston skirt, so that the lower piston edge is formed by the terminating area of the piston skirt, which revolves in an apparently circular manner.

The internal combustion engine according to the invention encompasses an outlet cross section of the transfer channel into the combustion chamber, which can be controlled by means of an upper piston edge in the known manner, wherein the inlet cross section with the lower piston edge is reduced by means of the stroke movement, when the outlet cross section is increased and/or wherein the inlet cross section is increased, when the outlet cross section is reduced. The outlet cross section can in particular be open by means of the upper piston edge, while the inlet cross section, reduced by the lower piston edge, is reduced to a defined, reduced gap or is even closed. When the outlet cross section is closed by means of the upper piston edge, the inlet cross section is open wide again by means of the lower piston edge. A type of shuttle valve control is formed with this, and the transfer channel is filled with a discrete quantity of the ignition mixture with each piston stroke, and the discrete quantity of the ignition mixture from the transfer channel reaches the combustion chamber, when the outlet cross section of the transfer channel into the combustion chamber is released by means of the upper piston edge, without a direct fluidic connection being present between the crankcase and the combustion chamber, when the piston is located in the bottom dead centre.

The improvement of the running characteristics of the internal combustion engine by means of the control according to the invention of the inlet cross section of the transfer channel or transfer channels can be ascribed to the following context: When the piston moves in the direction of the bottom dead centre and when the piston thus releases the outlet cross section of the transfer channel into the combustion chamber, a higher pressure prevails in the combustion chamber than in the transfer channel. The mixture quantity located in the transfer channel is thus pushed back into the crankcase. A burnt mixture, thus exhaust gas, can thereby also reach from the combustion chamber via the transfer channel or transfer channels into the crankcase, which initially pushed back the mixture. From a certain point on, namely when a pressure equilibrium prevails between the combustion chamber and the crankcase and when the pressure in the crankcase subsequently becomes larger than the continuously decreasing pressure in the combustion chamber, the flow movement in the transfer channel reverses in the direction of the combustion chamber. The partial closing of the transfer channel at the inlet cross section can thereby ensure that adjusted flow ratios, which effect a clear separation of exhaust gas in the transfer channel and ignition mixture in the crankcase, prevail in the reversed phase. It thereby turned out to be advantageous to not completely close the inlet cross section of the transfer channel, but to only reduce it to a gap, in particular when the internal combustion engine is operated in idle mode or close to idle mode.

In a particularly advantageous manner, a reduction of the inlet cross section of the transfer channel in the bottom dead centre or preferably across an area of the bottom dead centre of the piston can take place by means of the interaction of the lower piston edge with the at least one area of the crankcase. The inlet cross section and/or the lower piston edge can encompass a geometric embodiment, which causes a reduction or a complete closing of the inlet cross section between the crankcase and the transfer channel. In the event that the piston is in the area of the bottom dead centre, for example, the lower piston edge can open the outlet cross section between the transfer channel and the combustion chamber, while the inlet cross section of the transfer channel to the crankcase is reduced to a reduced gap. The quantity of ignition mixture, which entered from the crankcase into the transfer channel via the crank stroke, consequently reaches into the combustion chamber, and it is prevented that a larger quantity of ignition mixture reaches into the combustion chamber, without it being necessary for the combustion, for example due to an increased pressure in the crankcase. In particular the effect of the discrete metering of a quantity of ignition mixture beyond the volume of the at least one transfer channel, which is filled with excess pressure, leads to an improved exhaust gas quality and in particular to a reduced consumption of fuel when operating the internal combustion engine. In particular, provision can be made for a plurality of transfer channels, comprising respective inlet cross sections and outlet cross sections between the crankcase and the combustion chamber, wherein each transfer channel can preferably be controlled with different opening and closing times of the inlet cross sections and/or of the outlet cross sections.

A particular improvement of the operation of the internal combustion engine is attained in particular when a residual gap remains between the lower piston edge and the counter body. The size of the residual gap can be between 1 mm and 3 mm, for example, for typical overall sizes of internal combustion engines for handheld engine-driven devices, when the stroke volume is between approx. 30 ccm and approx. 80 ccm. With reference to the diameter of the piston and of the stroke volume of the internal combustion engine, it can be specified in an exemplary manner that in response to a piston diameter of 38 mm and a stroke volume of 35 ccm a residual gap of 1.2 mm, in response to a piston diameter of 45 mm and a stroke volume of 50 ccm a residual gap of 1.5 mm and in response to a piston diameter of 52 mm and stroke volume of 81 ccm a residual gap of 2 mm can attain particularly advantageous results.

In the event that the piston is in the bottom dead centre, the ratio of the free outlet cross section of the transfer channel, thus of the end, which points in the direction of the combustion chamber, to the gap between lower piston edge and counter body, which remains free, can be between approximately 1.9 and 2.2. That is, the outlet cross section of the transfer channel can be approximately twice as large as the gap on the lower piston edge, which remains free. When the ratio becomes larger and the gap thus becomes smaller, power of the internal combustion engine is lost, but the idling behaviour can improve. The specific emissions thus increase, when they are based on the respective output power. In the event that the ratio becomes smaller and the gap thus becomes larger, the emissions and thus also the specific emissions increase. The ratio of the remaining gap in the inlet cross section to the piston diameter can in particular be between 1:60 and 1:10 and preferably between 1:40 and 1:20.

According to a preferred exemplary embodiment of the internal combustion engine, the piston can encompass a piston skirt comprising an inner side and comprising an outer side. The lower piston edge is thereby formed by means of the lower area of the piston skirt. The area of the crankcase, which interacts with the lower piston edge, can encompass a projection and the projection can interact for example with the inner side of the lower piston edge to control and in particular to close the inlet cross section of the transfer channel, when the piston is in the area of the bottom dead centre. For example, the area of the crankcase, which interacts with the lower piston edge, can also encompass a ledge, wherein the ledge interacts with the outer side of the lower piston edge to control and in particular to reduce the inlet cross section of the transfer channel, when the piston is in the area of the bottom dead centre. It goes without saying that the operative connection between the lower piston edge and the crankcase can also be embodied such that a simultaneous control effect or closing effect, respectively, of the inner side as well as of the outer side of the lower piston edge is attained by means of the projection or by means of the ledge, respectively.

The cylinder of the internal combustion engine according to the invention can be embodied as a die cast cylinder comprising at least one transfer channel, which is embodied so as to be open on the piston side. The transfer channel is closed by means of the jacket surface of the piston, as is described in the introduction of DE 197 07 767 B4. It is also possible for the cylinder of the internal combustion engine according to the invention to be embodied as gravity cast cylinder comprising at least one transfer channel, which is introduced in the body of the cylinder and which is thus embodied so as to be closed, as is described in the introduction in DE 102 10 892 A1. A control according to the invention of the inlet cross section of the transfer channel between the crankcase and the transfer channel can be made possible for the design of the cylinder as a die cast cylinder as well as for the design of the cylinder as a gravity cast cylinder. Cylinders, which comprise inserted bushings, can also be used for the internal combustion engine according to the invention, so that a closed transfer channel is formed through this. Provision can further be made in the area of the transfer opening to the cylinder for additional covers, for attaining an improved contour of the transfer channel or transfer channels.

In a further advantageous manner, at least the area of the crankcase, which interacts with the lower piston edge, can encompass a recess, by means of which the inlet cross section of the transfer channel is increased, when the piston is moved in the direction of the top dead centre. The mentioned geometric measures of the crankcase, for example the projection for the operative connection with the inner side of the lower piston edge, the distance for the operative connection with the outer side of the lower piston edge and/or the recess for increasing the inlet cross section can be provided in the areas of the crankcase housing, in which the inlet cross sections of the transfer channels are present. The mentioned measures must thus not be introduced in their entirety in the area of the crankcase, which can interact with the lower piston edge.

In a particularly advantageous manner, the at least one transfer channel or a plurality of transfer channels can encompass a volume, which is determined such that the ignition mixture, which escapes from the transfer channel or from the transfer channels, encompasses a mass, which corresponds to the mass of a combustion chamber filling of a load change with ignition mixture. The mass of the ignition mixture can be controlled by means of the allocation of the ignition mixture according to the invention from the crankcase into the combustion chamber in that the primary pressure of the ignition mixture in the crankcase is changed. A high primary pressure of the ignition mixture in the crankcase causes a larger filling quantity of the ignition mixture in the transfer channels, until the inlet cross section is reduced by means of the lower piston edge and is closed, in particular. In spite of the allocation of the ignition mixture according to the invention from the crankcase into the combustion chamber, the control of the quantity of ignition mixture, which is to be introduced into the combustion chamber, can thus be controlled in the same manner, in that the pressure of the ignition mixture in the crankcase is adapted.

The internal combustion engine can be embodied as a two-stroke internal combustion engine, in particular for a handheld engine-driven device, such as a garden and park care device or for a moped, a boat engine and the like, which is preferably embodied without pre-filtration system. The pre-filtration system is based on either providing fresh air or old gas to the mixture from the crankcase upstream or to shield the outlet during the entire load change by means of a fresh air curtain. The instant invention, however, can preferably be used for internal combustion engines without a pre-filtering system.

The invention is further directed to an engine-driven device comprising an above-described internal combustion engine and the listed features and/or advantages of the internal combustion engine, which can also be used for the engine-driven device according to the invention.

The invention further relates to a method for operating an internal combustion engine comprising a crankcase and comprising a cylinder, wherein a piston carries out a stroke movement in the cylinder and thus movably defines a combustion chamber, and wherein at least one transfer channel, through which ignition mixture is guided from the crankcase into the combustion chamber, is arranged in the cylinder, and provision is made for the piston to be embodied with a lower piston edge, which interacts with at least one counter body, so that an inlet cross section of the transfer channel is controlled by means of the stroke movement of the piston by means of the lower piston edge for the entry of the ignition mixture from the crankcase into the transfer channel. The features and advantages, which have been described above for the internal combustion engine, can also be used for embodying the method.

BRIEF DESCRIPTION OF THE DRAWINGS

Further measures, which improve the invention, will be defined in more detail below, together with the description of a preferred exemplary embodiment of the invention, by means of the figure.

PREFERRED EMBODIMENTS OF THE INVENTION

Figure 1:
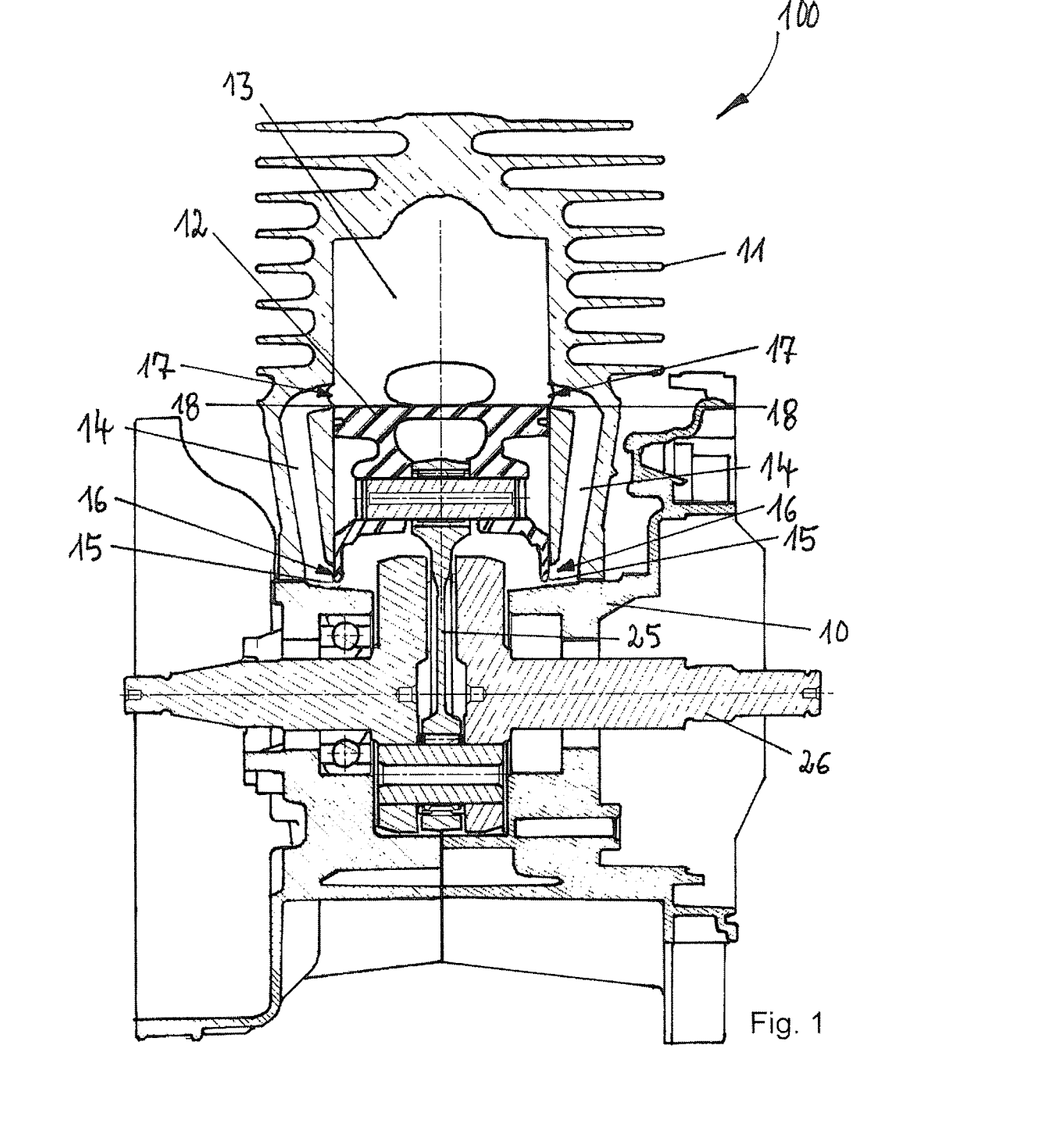
FIG. 1 shows a cross sectional view through an internal combustion engine comprising a piston and a lower piston edge, which, in operative connection with a crankcase as counter body, controls the inlet cross section of a transfer channel.

FIG. 1 shows an internal combustion engine 100 in a cross sectional view, comprising a crankcase 10 and comprising a cylinder 11, wherein a piston 12 is guided in the cylinder 11 so as to be able to perform a stroke movement and thus movably defines a combustion chamber 13, which is embodied in the cylinder 11. The shown piston 12 is located in the bottom dead centre and is connected to a crankshaft 26 via a connecting rod 25. When the piston 12 performs a stroke movement, the stroke movement of the piston 12 is transferred into a rotary movement of the crankshaft 26 via the connecting rod 25. The crankshaft 26 is accommodated so as to be supported in a rotatable manner in a crankcase 10 and the cylinder 11 is arranged on the top side of the crankcase 10.

The internal combustion engine 100 is embodied as a two-stroke internal combustion engine, and ignition mixture reaches from the crankcase 10 into the combustion chamber 13 via two illustrated transfer channels 14. The shown cylinder 11 is embodied in an exemplary manner as gravity cast cylinder, and the transfer channels 14 are introduced in the body of the cylinder 11 so as to be closed.

A respective inlet cross section 16 is shown in the transition between the interior of the crankcase 10 and the transfer channels 14, and ignition mixture can reach from the interior of the crankcase 10 into the transfer channels 14 via the inlet cross sections 16. The ignition mixture can be transferred from the transfer channels 14 into the combustion chamber 13 through outlet cross sections 17.

The piston 12 is shown in the position of its bottom dead centre and, according to the invention, a lower piston edge 15 controls the inlet cross section 16 between the crankcase 10 and the transfer channels 14. The exemplary embodiment shows a reduction of the inlet cross sections 16 in the shown bottom dead centre of the piston 12. At the same time, an upper piston edge 18 releases outlet cross sections 17 between the transfer channels 14 and the combustion chamber 13 in the cylinder 11 substantially completely.

When the piston 12 moves in the direction of the top dead centre due to a further rotation of the crankshaft 26, the lower piston edge 15 completely releases the inlet cross sections 16 of the transfer channels 14 again, while the upper piston edge 18 closes the outlet cross sections 17 between the transfer channels 14 and the combustion chamber 13. The exemplary embodiment consequently shows a control of the inlet cross sections 16 of the transfer channels 14 between the crankcase 10 and the volume of the transfer channels 14. The control of the inlet cross sections 16 takes place in operative connection of the lower piston edge 15 by means of a counter body 10, which is formed by an area of the crankcase 10 and which is illustrated in more detail in the figures below with further features.

Figure 2:
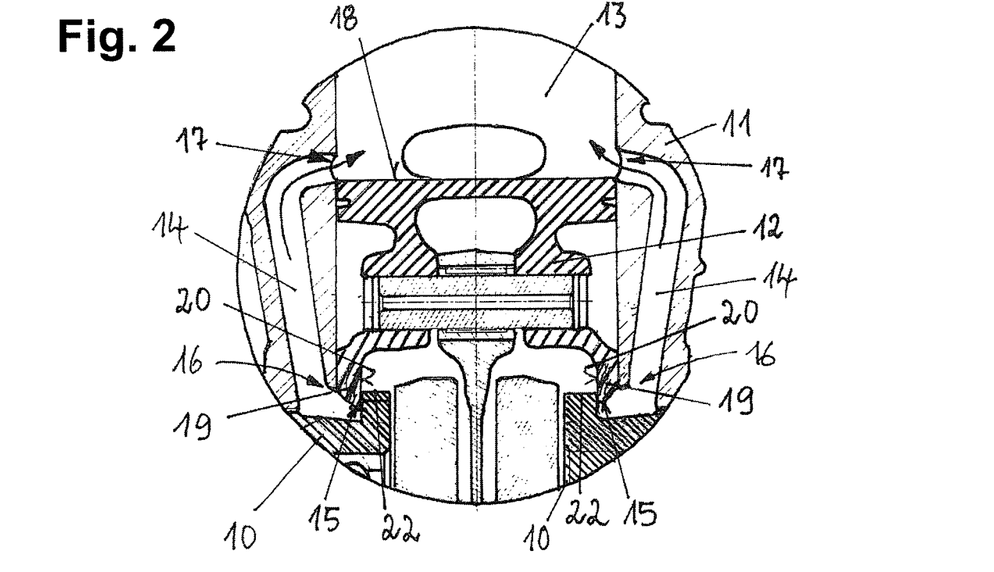
FIG. 2 shows a detailed view of a piston in a cylinder, said cylinder being embodied as gravity cast cylinder, wherein the piston is located in the area of the bottom dead centre.

FIG. 2 shows a detailed view of the piston 12 in the bottom dead centre in the cylinder 11 of the internal combustion engine 100. The piston 12 encompasses a lower piston edge 15, and the lower piston edge 15 has respective inner sides 20, at least in sections in the area of two shown transfer channels 14. At a location, which corresponds to the transfer channels 14, the crankcase 10 encompasses projections 22, and, in the shown position of the bottom dead centre of the piston 12, the inner sides 20 of the lower piston edge 15 interact with the projections 22 such that the inlet cross sections 16 of the transfer channels 14 to the crankcase 10 are reduced greatly. In the shown position, only a very small quantity of ignition mixture or even no ignition mixture can reach from the crankcase 10 into the transfer channels 14 via the inlet cross sections 16.

The transfer channels 14 encompass outlet cross sections 17 in a stroke height, in which they are opened by means of the shown upper piston edge 18, because the piston 12 is in the shown position of the bottom dead centre. When the piston 12 moves into the direction of the top dead centre again, the lower piston edge 15, which forms the appendage on the piston skirt 19, completely opens the inlet cross sections 16 again, while the outlet cross sections 17 are closed again.

Figure 3:
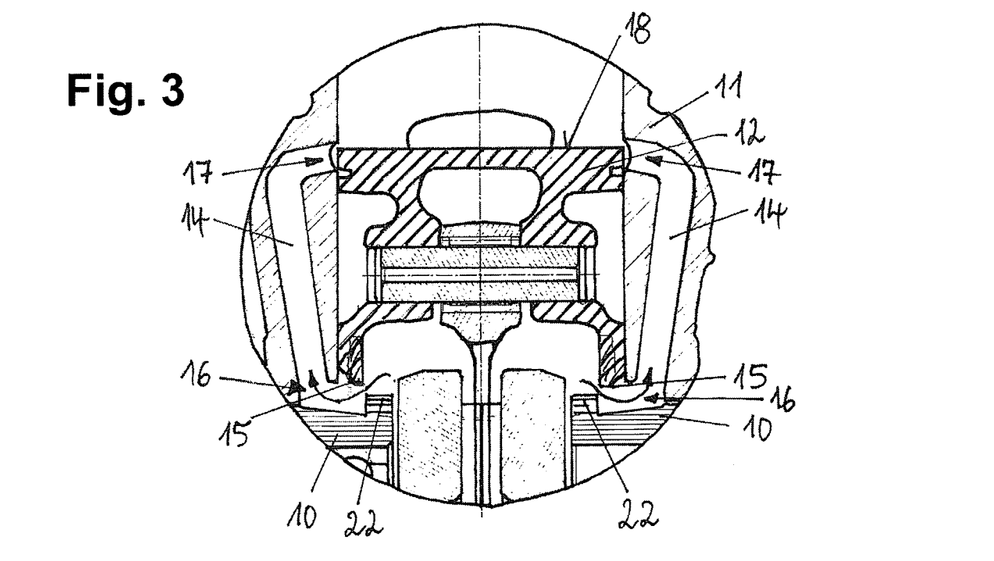
FIG. 3 shows the exemplary embodiment according to FIG. 2, wherein the piston is located in the area between the bottom dead centre and the top dead centre.

FIG. 3 shows the detailed view of the internal combustion engine 100 according to FIG. 2, wherein the piston 12 has left the position of the bottom dead centre, so that the inlet cross sections 16 of the transfer channels 14 are open again, because the lower piston edge 15 is not engaged with the projections 22 of the crankcase 10. It can be seen at the same time that the upper piston edge 18 closes the outlet cross sections 17, and the transfer channel 14 can be filled with ignition mixture from the crankcase 10, as is suggested by the fluid arrows in the inlet cross sections 16, while the outlet cross sections 17 remain closed and when the piston 12 passes through the top dead centre.

The cylinder 11 according to the exemplary embodiment in FIGS. 2 and 3 is embodied as gravity cast cylinder and encompasses closed transfer channels 14, which are introduced on the inner side in the body of the cylinder 11.

Figure 4:
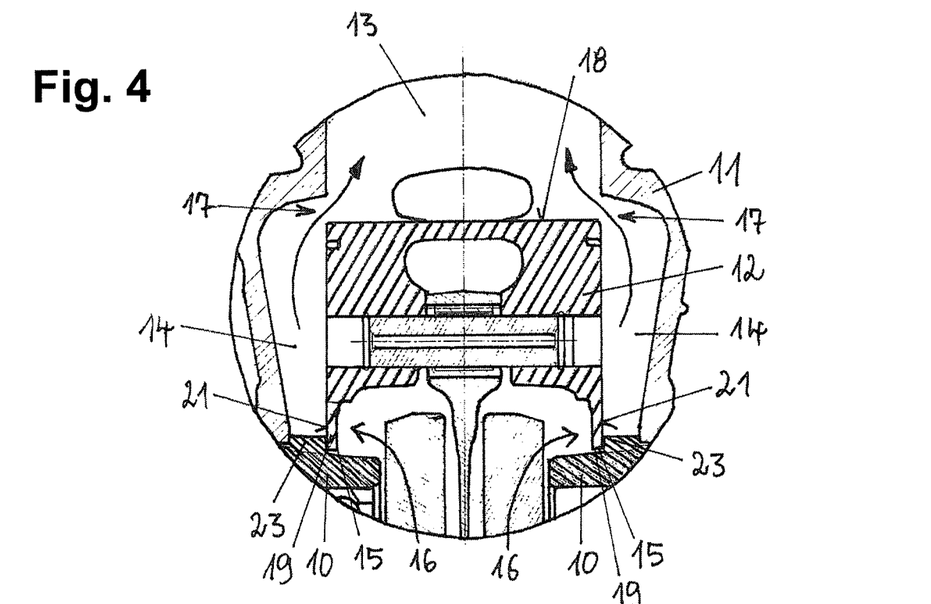
FIG. 4 shows a detailed view of a piston in a cylinder, said cylinder being embodied as die cast cylinder, wherein the piston is located in the area of the bottom dead centre.
Figure 5:
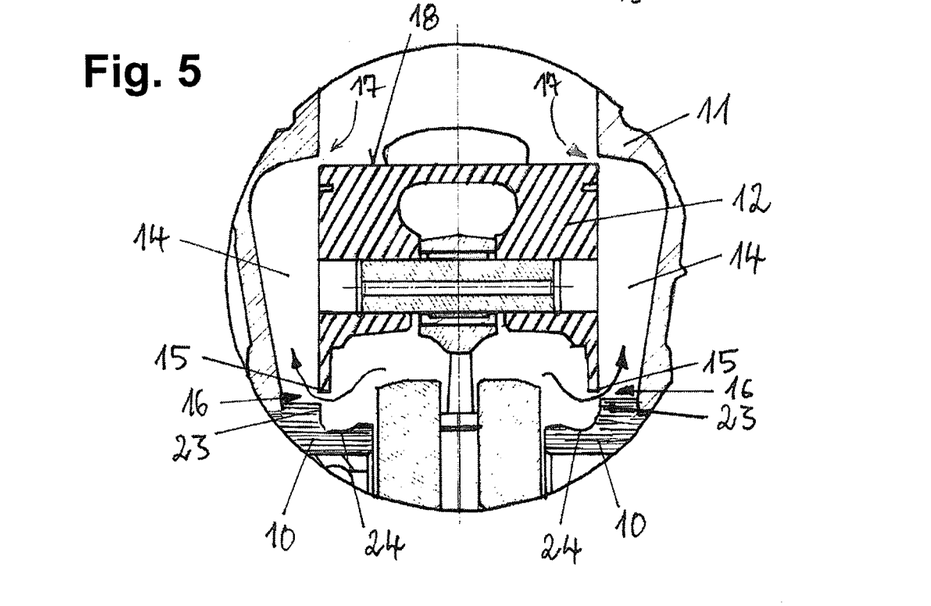
FIG. 5 shows the exemplary embodiment according to FIG. 4, wherein the piston is located in the area between the bottom dead centre and the top dead centre.

FIGS. 4 and 5 show an exemplary embodiment of an internal combustion engine comprising a cylinder 11, in which the piston 12 is shown in different stroke positions. The cylinder 11 is embodied in an exemplary manner as cast die cylinder and encompasses transfer channels 14, which are embodied so as to be open on the piston side.

FIG. 4 shows the piston 12 in the position of the bottom dead centre in the cylinder 11, and the lower piston edge 15 interacts with the crankcase 10 such that the inlet cross sections 16 are closed in an exemplary manner; they can, however, also be reduced to only a small gap. The operative connection for closing the inlet cross sections 16 between the lower piston edge and the crankcase 10 takes place via the outer side 21 of the piston skirt 19, and the outer side 21 interacts with a ledge 23 at the corresponding location in the crankcase 10. In the shown position of the bottom dead centre, the upper piston edge 18 opens the outlet cross sections 17 of the transfer channels 14 at the same time, so that ignition mixture can reach from the transfer channels 14 into the combustion chamber 13, as is suggested by means of the fluid arrows.

FIG. 5 finally shows the exemplary embodiment according to FIG. 4, wherein the piston 12 has left the position of the bottom dead centre and is moved in the direction of the top dead centre in the cylinder 11. Through this, the lower piston edge 15 becomes disengaged from the ledge 23, and the inlet cross sections 16 are opened, while the outlet cross sections 17 of the transfer channels 14 are closed by means of the upper piston edge 18.

In the crankcase 10, recesses 24 are shown in an exemplary manner at the position of the inlet cross sections 16 of the transfer channels 14, whereby a flow of the ignition mixture from the crankcase 10 into the transfer channels 14 is promoted, when the piston 12 has left the area of the bottom dead centre.

Figure 6:
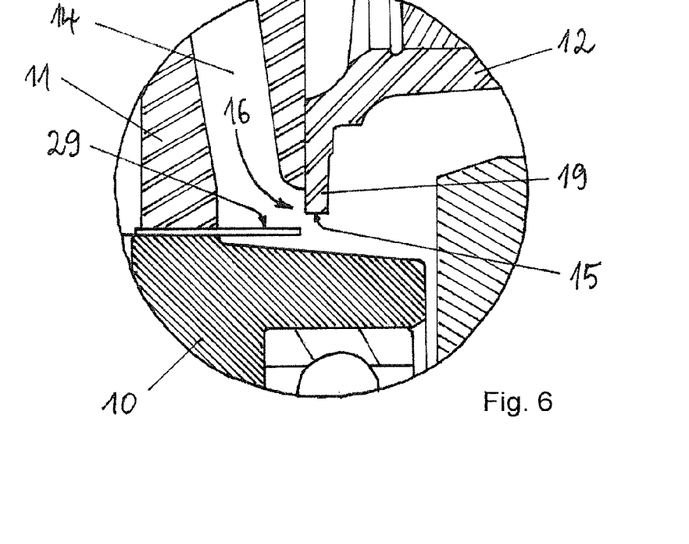
FIG. 6 shows a detailed view of a further exemplary embodiment of the counter body, which is formed by means of a part of a cylinder base seal.

FIG. 6 shows a further exemplary embodiment for controlling the inlet cross section 16 of the transfer channel 14 in the cylinder 11 of the internal combustion engine. A cylinder base seal 29 is arranged between the cylinder 11 and the crankcase 10, and the cylinder base seal 29 encompasses a partial area, which extends partially into the inlet cross section 16 of the transfer channel 14. The lower piston edge 15, which is located on the bottom side of the piston skirt 19, can interact with the cylinder base seal 29 so as to narrow the cross section as a function of the stroke position of the piston 12, whereby the inlet cross section 16 of the transfer channel 14 can be controlled. In particular, the inlet cross section 16 between the lower piston edge 15 and the cylinder base seal 29 in the bottom dead centre of the piston 12 can be reduced to a gap, which is so small that the desired effect of improving the running characteristics of the internal combustion engine is attained.

Figures 7A, 7B:
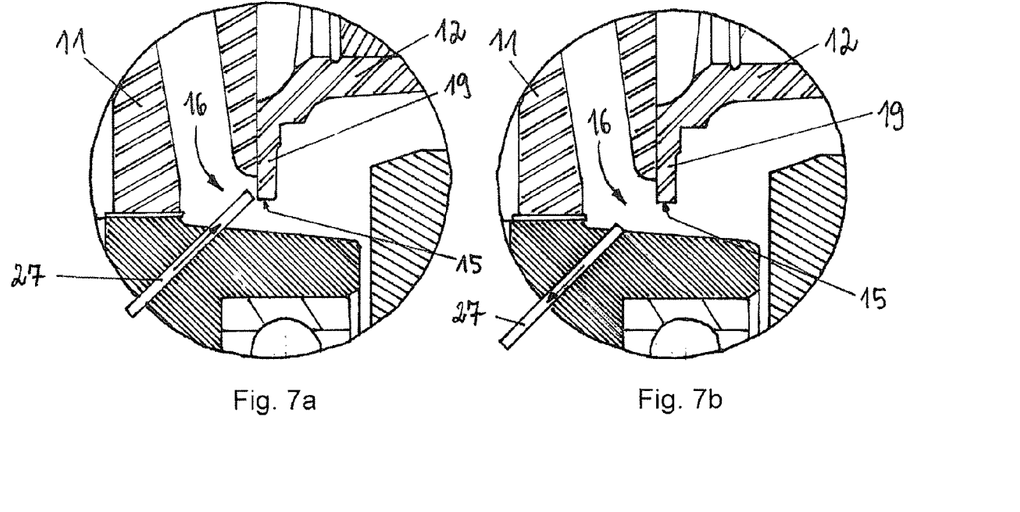
FIG. 7a shows a detailed view of a further exemplary embodiment of the counter body, which is formed by means of a movable control element, which is in an advanced position.
FIG. 7b shows the detailed view of the movable control element according to FIG. 7a, which is in a retracted position

FIGS. 7a and 7b show a further exemplary embodiment of a counter body 27, which is designed as a movable control element 27, and which can interact with the lower piston edge 15 on the piston skirt 19 of the piston 12 to control the inlet cross section 16 of the transfer channel 14 in the cylinder 11. The control element 27 can be moved in the shown arrow direction, and the control element 27 in FIG. 7a is shown so as to be inserted into the inlet cross section 16 of the transfer channel 14, whereas the control element 27 in FIG. 7b is shown so as to be retracted from the inlet cross section 16 of the transfer channel 14.

The movable control element 27 can be movable manually, with the centrifugal force of at least one rotating component of the internal combustion engine, electromechanically, pneumatically, hydraulically or piezoelectrically or in another manner. The exemplary embodiment shows the control element 27 in an arrangement, which is accommodated in the crankcase 10, wherein the control element 27 can be accommodated in the same manner, for example in the cylinder 11.

Figure 8:
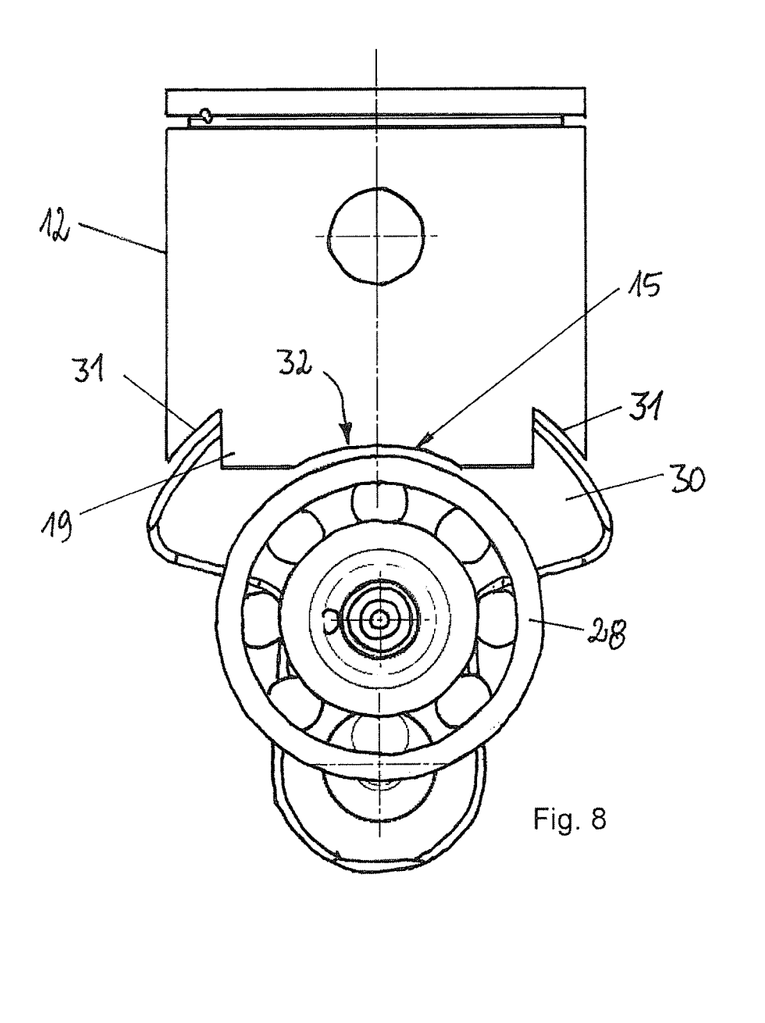
FIG. 8 shows a further exemplary embodiment of a counter body, which is formed by means of a crankshaft bearing for forming a gap in the inlet cross section.

FIG. 8 finally shows a view of a piston 12 comprising a piston skirt 19, on which a lower piston edge 15 is embodied. The piston 12 is shown in a position in the bottom dead centre, wherein the lower piston edge 15 with a crankshaft bearing 28 forms a gap, which, as already described above, can form a reduction of the inlet cross section 16 of a non-illustrated transfer channel in a cylinder, which is also not illustrated. So that the gap between the lower piston edge 15 and the crankshaft bearing 28 in the bottom dead centre can be reduced to a measure of between 1 mm and 3 mm, for example, the piston encompasses cavities 31, through which the crankshaft counter weight 30 can pass with rotation of the crankshaft in a collision-free manner. Due to the fact that the crankshaft bearing 28 encompasses a round outer contour, the piston skirt 19 is adapted to the round outer contour of the crankshaft bearing 28 in the area, in which the lower piston edge 15 forms the gap with the crankshaft bearing 28 and thus forms a round restriction 32, which is directed inwards. The shown alternative for forming a gap in the inlet cross section 16 can be converted advantageously when a cylinder is used, in the case of which a part of the crankcase is embodied on the cylinder, in particular cast on.

The embodiment of the invention is not limited to the above-specified preferred exemplary embodiment. Instead, a number of alternatives is possible, which uses the illustrated solution even in the case of embodiments, which are on principle of a different nature. All of the features and/or advantages, which result from the claims, the description or the drawings, including structural details or spatial arrangements, can be significant for the invention, either alone as well as in a variety of combinations. The shown shapes of the cylinder 11 as gravity cast cylinder according to the illustration in FIGS. 2 and 3 or as die cast cylinder according to the illustration in FIGS. 4 and 5 are only provided in an exemplary manner, and the respective shown features can be used for both structural cylinder shapes. In the case of an internal combustion engine 100 comprising a gravity cast cylinder, the inlet cross section 16 of the transfer channels 14, for example, can also be controlled, in particular closed, in that the outer side 21 of the piston skirt 19 interacts with a ledge 23 of the crankcase 10. In contrast, a closing of the inlet cross sections 16 of the transfer channels 14 can also be attained in the case of an internal combustion engine 100 comprising a cylinder 11, which is embodied as die cast cylinder, in that the inner side 20 of the piston skirt 19 interacts with a projection 22 on the crankcase 10. In particular, a recess 24 according to the exemplary embodiment in FIG. 5 can also be used, when the internal combustion engine 100 is designed with a cylinder 11 in the manner of a gravity cast cylinder.

LIST OF REFERENCE NUMERALS 100 internal combustion engine
10 crankcase
11 cylinder
12 piston
13 combustion chamber
14 transfer channel
15 lower piston edge
16 inlet cross section
17 outlet cross section
18 upper piston edge
19 piston skirt
20 inner side
21 outer side
22 projection
23 ledge
24 recess
25 connecting rod
26 crankshaft
27 control element
28 crankshaft bearing
29 cylinder base seal
30 crankshaft counter weight
31 cavity
32 constriction

The invention claimed is:

1. An internal combustion engine comprising:
a crankcase;
a cylinder;
a piston guided in the cylinder and configured to perform a stroke movement and to movably define a combustion chamber;
at least one transfer channel arranged in the cylinder and configured to transfer an ignition mixture from the crankcase into the combustion chamber; and
at least one counter body, wherein
the piston includes a lower piston edge, which interacts with the at least one counter body such that an inlet cross section of the at least one transfer channel that receives the inflow of the ignition mixture from the crankcase can be controlled by the lower piston edge during the stroke movement of the piston, and
at least one of a reduction and a closing of the inlet cross section of the at least one transfer channel is effected by the interaction of the lower piston edge with the at least one counter body when the stroke movement of the piston reaches one of a bottom dead center position and an area of the bottom dead center position.

2. The internal combustion engine according to claim 1, wherein the counter body is provided by at least one of an area of the crankcase, a control element, a crankshaft bearing for supporting a crankshaft of the internal combustion engine and a part of a cylinder base seal.

3. The internal combustion engine according to claim 1, wherein the at least one transfer channel includes an outlet cross section, which ends in the combustion chamber and which is configured to be controlled by an upper piston edge, and wherein at least one of the inlet cross section is reduced by the stroke movement of the piston when the outlet cross section is increased, and the inlet cross section is increased when the outlet cross section is reduced.

4. The internal combustion engine according to claim 1, wherein the piston includes a piston skirt having an inner side and an outer side, and wherein the lower piston edge defines a lower area of the piston skirt.

5. The internal combustion engine according to claim 4, wherein the area of the crankcase, which interacts with the lower piston edge, includes a projection, and wherein the projection interacts with the inner side of the lower piston edge to control and to at least one of reduce and close the inlet cross section of the at least one transfer channel when the piston is in the area of the bottom dead center.

6. The internal combustion engine according to claim 4, wherein the area of crankcase, which interacts with the lower piston edge includes a ledge, and wherein the ledge interacts with the outer side of the lower piston edge to control and to at least one of reduce and close the inlet cross section of the at least one transfer channel when the piston is in the area of the bottom dead center.

7. The internal combustion engine according to claim 1, wherein the cylinder of the internal combustion engine is a die cast cylinder comprising the at least one transfer channel, and wherein the at least one transfer channel is open on the piston side.

8. The internal combustion engine according to claim 1, wherein the cylinder of the internal combustion engine is a gravity cast cylinder comprising the at least one transfer channel, and wherein the at least one transfer channel is closed.

9. The internal combustion engine according to claim 1, wherein at least the area of the crankcase, which interacts with the lower piston edge, includes a recess configured to increase the inlet cross section of the at least one transfer channel when the piston is moved in the direction of the top dead center.

10. The internal combustion engine according to claim 1, wherein the at least one transfer channel includes a volume such that the ignition mixture, which escapes from the at least one transfer channel, includes a mass, which corresponds to a mass of a combustion chamber filling of a load change with the ignition mixture.

11. The internal combustion engine according to claim 1, wherein at least one of a ratio of a free section of an outlet cross section of the at least one transfer channel into the combustion chamber to a gap between the lower piston edge and the counter body, which remains free, is between approximately 1.9 and 2.2 in the bottom dead center of the piston and a ratio of a remaining gap in the inlet cross section to the piston diameter is between 1:60 and 1:10.

12. The internal combustion engine according to claim 11, the ratio of the remaining gap in the inlet cross section to the piston diameter is between 1:40 and 1:20.

13. The internal combustion engine according to claim 1, wherein the counter body is provided by a movable control element.

14. The internal combustion engine according to claim 13, wherein the movable control element is configured to be be moved at least one of manually, with the centrifugal force of at least one rotating component of the internal combustion engine, electromechanically, pneumatically, hydraulically and piezoelectrically.

15. The internal combustion engine according to claim 1, wherein the internal combustion engine is a two-stroke internal combustion engine without a pre-filtration system for a handheld engine-driven device.

16. An engine-driven device comprising the internal combustion engine according to claim 1.

17. A method for operating an internal combustion engine, the internal combustion engine comprising:
a crankcase;
a cylinder;
a piston guided in the cylinder and configured to perform a stroke movement and to movably define a combustion chamber;
at least one transfer channel arranged in the cylinder and configured to transfer an ignition mixture from the crankcase into the combustion chamber; and
at least one counter body, wherein
the piston includes a lower piston edge, which interacts with the at least one counter body such that an inlet cross section of the at least one transfer channel that receives the inflow of the ignition mixture from the crank case can be controlled by the lower piston edge during the stroke movement of the piston, the method comprising controlling the inlet cross section of the at least one transfer channel by at least one of reducing and closing the inlet cross section of the at least one transfer channel by the interaction of the lower piston edge with the at least one counter body by moving the piston to one of a bottom dead center and an area of the bottom dead center position.

18. The method for operating the internal combustion engine according to claim 17, wherein the counter body is defined by at least one of an area of the crankcase, a control element, a crankshaft bearing for supporting a crankshaft of the internal combustion engine and a part of a cylinder base seal.

19. The method for operating the internal combustion engine according to claim 18, wherein the counter body is provided by a movable control element.

* * * * *